Aug. 31, 1937. J. G. CAPSTAFF 2,091,699
OPTICAL SYSTEM FOR COLOR PROCESSES
Filed March 17, 1936    2 Sheets-Sheet 1

John G. Capstaff,
INVENTOR:
BY Newton N. Perrins
ATTORNEY.

Aug. 31, 1937.  J. G. CAPSTAFF  2,091,699
OPTICAL SYSTEM FOR COLOR PROCESSES
Filed March 17, 1936  2 Sheets-Sheet 2

John G. Capstaff,
INVENTOR:
BY Newton N. Perrins
ATTORNEY.

Patented Aug. 31, 1937

2,091,699

UNITED STATES PATENT OFFICE 2,091,699

OPTICAL SYSTEM FOR COLOR PROCESSES

John G. Capstaff, Rochester, N. Y., assignor, by mesne assignments, to Eastman Kodak Company, Jersey City, N. J., a corporation of New Jersey Application March 17, 1936, Serial No. 69,316

4 Claims. (Cl. 88—16.4)

This invention relates to photographic color processes involving the use of lenticular film which is exposed through an objective provided with a banded color filter. In my copending application Serial No. 703,268, filed December 20, 1933, I have described and claimed an arrangement for eliminating color fringing due primarily to stereo-parallax arising from the fact that from the spaced color filter strips out-of-focus objects are viewed from different view points. The reason for this is clear when it is considered that an out-of-focus object, as seen from the sensitive film through the separate bands of the taking filter, is reproduced in three color images representing different view points. Accordingly, these three images are not in register except for objects in sharp focus on the film.

In my above identified application, this defect is eliminated by positioning a beam splitter or light dividing device in front of two or more of the color filter bands. By this arrangement, the light which would ordinarily pass through the central band, usually the green, is split up into three beams which are directed so that one passes through each of the three color filters. This arrangement gives complete freedom from color fringing. However, it involves a great loss of light and in the majority of scenes, it has been found that satisfactory results may be obtained using only a single beam splitter for registering the red and green images and letting the blue image remain out of register.

The employment of a beam splitter, or antifringer, in front of the taking filters introduces several serious complications, such as parallax between the incident and emergent focus of the beam splitter prism which tends to cause wedging; and the internal reflections in this prism or prisms set up certain ghost reflections or stray beams which must be eliminated or blocked off to secure the most satisfactory results.

The principal object of the present invention is to provide a beam splitter or anti-fringer so constructed as to prevent the ghost reflections or stray beams from falling on the film being exposed and also to absorb or otherwise eliminate the rays which would result in parallax between the incident and emergent focus of the prism.

A further object of the invention is the provision of a beam splitter construction which reduces to a minimum the glass-air surfaces. A still further object is the provision of front and back cover glasses for the beam splitter, whereby the number of surfaces requiring a high precision finish is reduced to two.

Other objects and advantages of my invention, as well as its underlying principles, will be readily understood from the following description when read in connection with the accompanying drawings in which Figure 1 is a diagram showing the path of rays entering a simple type of beam splitter at an angle below the axis.

Figure 1:
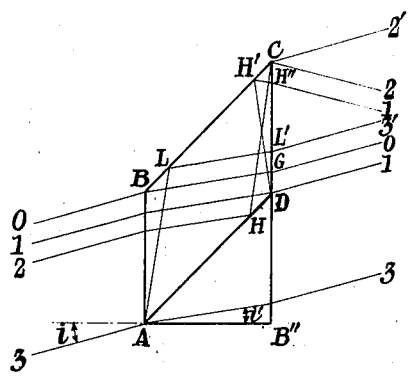

There is shown in Figure 1 of the drawings a diagrammatic representation of an equidimensional beam splitter for dividing an incident beam of light into two emergent beams in a well known manner by means of a suitable light dividing surface AD.

This may be a uniformly semitransparent silvered surface, or comprise alternate transparent and completely reflecting lines. The thickness of the prism AB'', is equal to the entering surface AB and to the emergent surfaces CD and B''D, this dimension being designated $k$ hereinafter. Beams entering at AB may be placed in three classes: (1) beams parallel to the axis, (2) beams incident from below the axis and (3) beams incident from above the axis.

In the figures, it is to be understood that the angles of the rays are considerably magnified in order to make the explanation clearer.

A beam entering the surface AB parallel to the axis will proceed without deviation to the light dividing surface AD through which half of the beam will be transmitted and emerge from DB''. The other half will be reflected by AD to BC, again reflected by BC and will emerge from CD. Both beams will emerge with their original width but displaced relatively to each other. There will, however, be no ghosts or stray beams.

Beams entering the surface AB from below the axis at an angle of incidence $i$, will have an angle in the glass of $i'$, as shown in Figure 1 and the destination of various entering rays may be determined by drawing them in at the angle $i'$. For glass having a refractive index of $\mu$ the relation between these angles will be $\sin i = \mu \sin i'$. By reference to Figure 1, it will be seen that the rays in the beam between lines 0 and 1 will pass directly through area GD of surface CD, thereby forming a direct beam which suffers no reflections and emerges between the lines 0 and 1 from the lower portion of the face CD. Rays between 1 and 2 are reflected from the area HD of the surface AD, then from the surface DC and lastly from the area H'C of the surface BC to emerge between lines 1 and 2 from the upper portion H''C of the surface DC as shown. Rays between 2 and 3 are partially reflected by the area AH of surface AD directly to area LC of surface BC which reflects them to emerge from area L'C of surface CD as a beam between the lines 2' and 3'. Rays between 1 and 3 are also transmitted through surface AD and emerge from surface B''D between the lines 1 and 3.

It is thus apparent that these three classes of rays result in three beams emerging from the surface CD as follows: (1) a direct beam with no reflections, (2) a beam with three reflections, and (3) a beam with two reflections. The useful beam, which the beam splitter is designed to provide is the beam with only two reflections. The beam with no reflections is not harmful for distant objects except to introduce color wedging, but the beam with three reflections is a harmful ghost which should be absorbed or masked off so as not to have any harmful effect upon the film being exposed.

Figure 2:
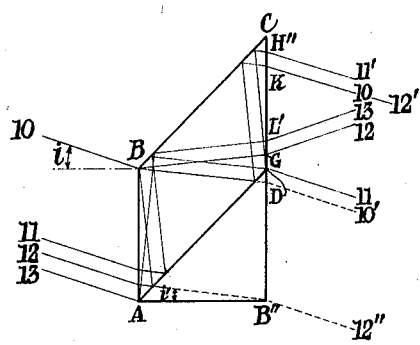
Figure 2 is a similar diagram showing the rays entering from an angle above the axis.

The diagram forming Fig. 2 of the drawing represents the paths of rays incident on the beam splitter surface AB from above the axis at an angle of incidence, $i$. In this figure the beam 10—11 is the main beam undergoing two reflections to emerge from the area KD of surface CD and is the useful reflected beam. The beam 11—12 is reflected four times from AD and BC and emerges as beam 11'—12' through the area KH'' of surface CD. It is to be noted that the line 12' limiting one beam is coincident with line 10, limiting the beam 10—11. This beam 11'—12' is not harmful at large object distances. The entering beam 12—13 is reflected three times, AD to AB to BC and then emerges from area L'G of surface CD as a stray ghost and is quite harmful. Rays between 10 and 12 also emerge without reflection between the lines 10' and 12''.

It thus becomes apparent that the parallax of the entrance windows will be eliminated or prevented by masking in from each side of the exit window. If $i$ is the maximum angle at which useful rays enter the system, then for the face B''D, the width of the mask from each side will equal $k \tan i'$ (since $\mu \sin i' = \sin i$), while for the face CD the width of the mask from each side will be $2k \tan i'$ due to the fact that the light passes through twice the thickness of the cube to reach the surface CD.

A mask for the face CD having a width $2k \tan i'$ is fortunately just sufficient also to block off the beams 0—1 and 12—13 at one edge and to block off the beams 1—2 and 11'—10 at the other edge.

Figure 3:
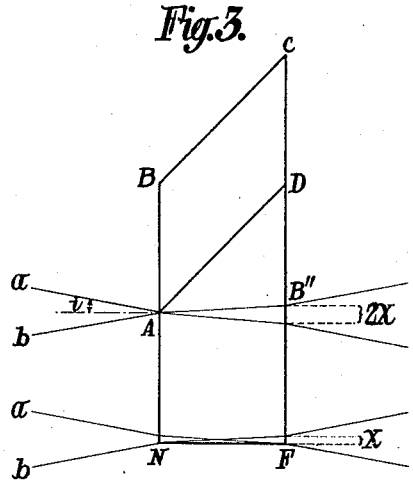
Figure 3 is a diagram illustrating the parallax between the front and rear faces of the beam splitter.
Figure 4:
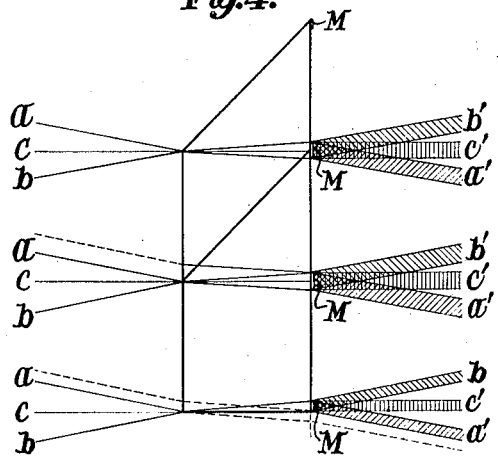
Figure 4 is a similar diagram illustrating the wedging of key-stone effect.

The parallax between the front and rear faces of the prism may be better understood by reference to Figure 3, which shows the two prisms used to form the simple beam splitter for use when color fringing is eliminated only between the red and green color images. In this figure, if $a$ and $b$ represent the limiting rays coming from the margins of the field of view of the lens, then the parallax is shown by the spaces X and 2X on the rear face of the right prism AB''FN. These values represent the widths of masks necessary to prevent parallax for the unreflected beams passing through the prism. That this parallax obviously tends to cause wedging is clearly shown in Fig. 4 which shows masks in position at M and in which the shaded areas $c'$, $a'$ and $b'$ show the projection of these masks by the central beam $c$ and the two marginal beams $a$ and $b$ respectively.

The value of X is $k \tan i'$ or $$\frac{k \tan i}{\mu}$$

where the maximum incident angle is $i$. This, it is to be noted, is the same value as the width of the beam 0—1 or 1—2. The angle $i$ may be obtained from the relation $\tan i = d/f$, where $d$ is half the picture height and $f$ is the focal length of the objective. That is, the width of X is $$\frac{1}{\mu} k \tan \frac{d}{f}$$

Figure 5:
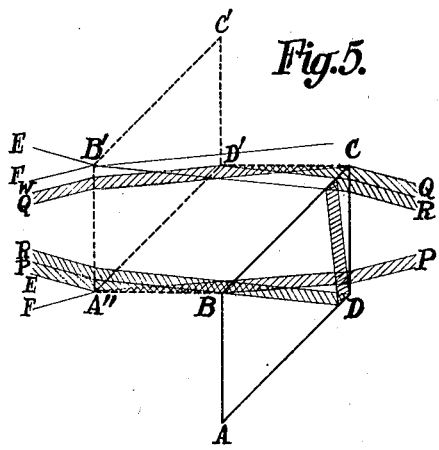
Figure 5 is a diagram illustrating a graphic solution of the design of the mask to be used with the beam splitter.

In Figure 5 of the drawing, there is illustrated a graphic solution of the problem of proper masking to eliminate ghosts and parallax in the reflected beam. In this figure the two incident marginal beams are represented by EE and FF. For the sake of clarity the reflecting prism of the beam splitter alone is shown. This prism AB CD may have A''B, CD' as the mirror image of the prism reflected in the face BC, while A'''B' C'D' indicates the twice reflected mirror image of AB CD, reflected first by AD and then by BC. It is thus apparent that A''B' becomes the front virtual window or limiting aperture of the prism for all twice reflected rays. The ghost reflections in Fig. 5 are represented by the shaded pencils Q, R and P. The necessary width of masks to eliminate these reflections is $2x$ on each side of the aperture. Here, $x$ has a value equal to that shown in Fig. 3 and pencil W is that beam which would pass through the prism without being reflected. This pencil W would cause serious wedging which would be aggravated by the fact that it is not reduced in intensity by the half silvered reflecting surface. Since the thickness of glass traversed is twice the thickness of the cube, then the magnitude of the parallax is seen to be twice that indicated in Fig. 3. However, as was pointed out above, the width of masks necessary proves to be the same for eliminating parallax as for getting rid of the ghost rays, as is clearly evident from the diagram.

In the actual construction of a beam splitter, in accordance with my invention, the filters are incorporated in the prism assembly to avoid the reflection loss from two additional glass-air surfaces. Further, in the interest of economy, it is desirable to reduce as far as possible the number of surfaces required to be finished to high precision. Since the assembly of two prisms, as indicated in Fig. 3, gives two different surfaces, both in front and rear, which must be parallel, it will be seen that a greater error in the parallelism of these surfaces can be tolerated if they are joined by cover glasses cemented to them. The two reflecting surfaces AD and BC should be parallel to at least 15 seconds of arc. The only other high precision requirement for the manufacture of an anti-fringer, in accordance with my invention, is that the two prisms shall be of the same refractive index and it is almost necessary that they be cut from the same block of glass.

Figure 6:
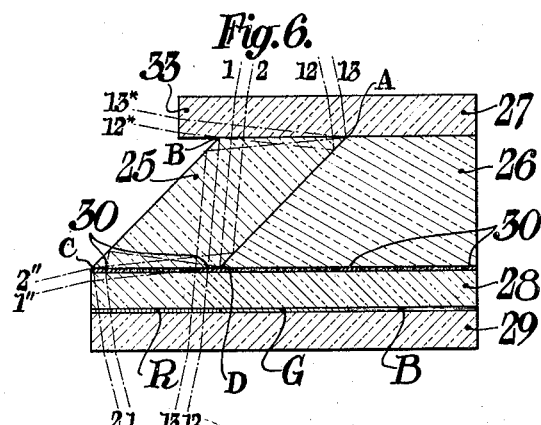
Figure 6 is a section of a simple beam splitter as constructed, embodying the improved features.

Fig. 6 of the drawings shows the assembly of a simple anti-fringer comprising a single beam splitter with its filters and cover glasses. This comprises two glass prisms, 25 and 26 of the structure and dimensions already described. Upon the front surfaces there is cemented with ordinary optical cement a cover glass 27, and upon the rear surfaces double cover glasses 28 and 29 between which are cemented three filter bands, B, G and R, which are respectively blue, green and red. Upon the rear surfaces of the prisms, masks 30 are formed by means of opaque shellac and over this the rear cover glass 28 is cemented. The masks are of the position and size already described.

The cover glasses particularly 27, the end 33 of which extends somewhat beyond the end of the prism block 25, has an additional function of eliminating certain secondarily internally reflected rays, thus still more completely eliminating "ghost" images.

Referring to Fig. 6, the beam 12—13, this being the same beam as is similarly designated in Fig. 2, is shown as entering the prism through the plate 27, and triply reflected from the surfaces AD, AB and BC, and emerging as a ghost beam, however, since the plate 27 is cemented to surface AB, with a cement having substantially the same refractive index as the glass, the beam, instead of being reflected by surface AB, passes harmlessly through the surface and the plate as shown as **12\*—13\***.

Similarly, the beam 1—2, instead of being triply reflected by surfaces AD, CD and BC, and emerging as described in connection with Fig. 1, passes through the cemented surface AD and plate 28 and harmlessly emerges as beam 1"—2". In practice, the ends of the plates are blackened so that these beams **12\*—13\* and 1"—2"** are absorbed at these end surfaces, and are neither internally reflected nor transmitted.

In other words, the ghost beam R in Fig. 5 is eliminated, thus permitting the narrowing of the mask, so far as this beam is concerned. The fact these cover glasses reduce or eliminate the intensity of ghosts gives an added factor of safety making it unnecessary to add an extra margin in the masks to compensate for possible slight errors in manufacture.

Figure 7:
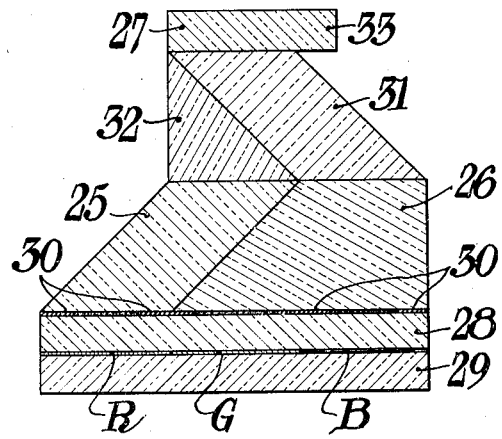
Figure 7 is a similar section of a more complex beam splitter.

Fig. 7 shows an assembled compound anti-fringer constructed in accordance with my invention for dividing a single beam of light into three beams as described in my application, Serial No. 703,268. The construction of a compound anti-fringer presents in general the same problems as the simple anti-fringer shown in Fig. 6 in so far as ghosts and parallax are concerned. In general, the filter areas have to be masked more due to the increased parallax encountered in the additional thickness of the prism. This, of course, greatly reduces the efficiency of the anti-fringer. The structure is the same as in Figure 6 except that the two additional prisms 31 and 32 are used as shown. The front and rear cover plates, masks and filters are added in the same way, except that the masked borders are greater.

Figure 8:
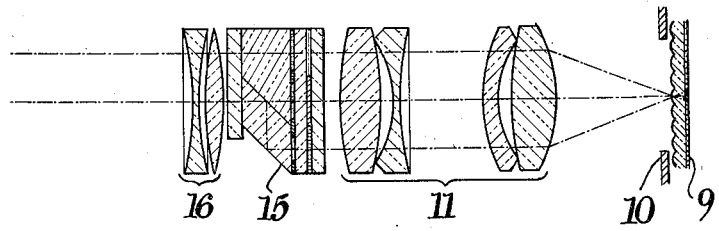
Figure 8 is a diagram of the complete optical system of a camera embodying my invention.

For the sake of completeness, the entire optical system is shown in Figure 8, this being the same as in said application. It comprises a lenticulated film 9, behind an exposure gate 10, having the height 2d, an objective 11 having a focal length f, in front of which is the light splitting assembly 15 as already described, the one shown being that fully illustrated in Figure 6. In front of this a collimating lens or objective 16 is placed. As is understood, the objective is fixedly focused for infinity and the collimating lens is focused for the particular subject. The paths of three rays parallel to the axis and central of the three beams, are shown in dot-dash lines.

Having thus described my invention, what I claim as new and desire to be secured by Letters Patent is:

1. A glass beam splitter for use in an optical system for taking photographs on lenticular film, and having a rear surface comprising three rectangular areas in the same plane, and comprising a 45° rhomboidal prism in front of the central area and one end area, the inclined surfaces being so positioned as to reflect light through said end rear area, the inclined surface in front of said end area being fully silvered, and the other inclined surface being partially silvered to transmit part of the light and to reflect part, and a second glass block having a solid rectangular portion in front of the other end area and extending across the central area and having an inclined surface in optical contact with the partially silvered surface, and masks extending over the borders of each of said surfaces a distance sufficient to intercept all ghost images due to parallax and internal reflection, and a relatively thick cover plate in optical contact with the front of the beam splitter and extending beyond the front edge of the fully silvered inclined surface, whereby light reflected by the silvered surface onto the front surface of said prism will pass therethrough.

2. An optical system for use in taking photographs upon sensitized lenticulated films and comprising an exposure gate, an objective focused upon said gate, a beam splitter in front of the objective and comprising a solid glass light dividing device adapted to transmit without reflection at least one beam of light having a sectional area of the order of one third of the sectional area of the optical system and adapted to transmit at least one doubly reflected beam having a sectional area of the order of one third of the sectional area of the optical system and adapted to transmit a third beam, the rear surfaces of the beam splitter from which the three beams emerge lying in the same plane, a mask for each of the beams at the surface of emergence and a cover plate for all three masks cemented to the masks and the said rear surfaces and three differently colored filters carried by the cover plate in alignment with the beams as defined by the masks, said cover plate having the same refractive index as and optically integral with the beam splitter.

3. An optical system for use in taking photographic records on lenticulated film and comprising an objective having a focal length f, an exposure gate at the rear focus of the objective and having a height 2d, three filter bands arranged side by side across the system, a beam splitter in front of the central band and at least one other filter band for dividing a single beam of light into two beams and directing one of the divided beams through the central filter band and another through one of the other bands, said beam splitter consisting of prisms having a thickness k made of glass with a refractive index μ, and a masking device behind the beam splitter and having openings corresponding to each of the filter bands, the width of the masking border being at least $$\frac{1}{\mu} k \tan \frac{d}{f}$$

about the opening for a beam passing through the beam splitter without reflection and being at least $$\frac{2}{\mu} k \tan \frac{d}{f}$$

about the opening for a reflected beam, whereby the masking borders intercept stray reflected rays and prevent the formation of ghost images.

4. An optical system for use in taking photographic records on lenticulated film and comprising an objective having a focal length $f$, an exposure gate at the rear focus of the objective and having a height $2d$, three filter bands arranged side by side across the system, a beam splitter in front of the filter bands and adapted to transmit beams through one side band without reflection, and to divide a central beam, transmitting a portion thereof to the central filter band and directing another portion by double reflection to the other side band, said beam splitter consisting of prisms of glass having a refractive index $\mu$ and having rear surfaces in a common plane, the thickness of the prism and the width of each rear surface being $k$, masks bordering such surfaces for each of the beams, the widths of the borders around the unreflected beams being at least $$\frac{1}{\mu} k \tan \frac{d}{f}$$

and around the reflected beam being at least $$\frac{2}{\mu} k \tan \frac{d}{f}$$

whereby the masks intercept stray reflected rays and prevent the formation of ghost images.

JOHN G. CAPSTAFF.